(12) United States Patent
Ogawa

(10) Patent No.: US 8,596,430 B2
(45) Date of Patent: Dec. 3, 2013

(54) ELECTRICAL SHOCK ABSORBER

(75) Inventor: Atsushi Ogawa, Nagoya (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 42 days.

(21) Appl. No.: 13/321,094

(22) PCT Filed: Jun. 17, 2010

(86) PCT No.: PCT/JP2010/060701
§ 371 (c)(1),
(2), (4) Date: Nov. 17, 2011

(87) PCT Pub. No.: WO2011/158383
PCT Pub. Date: Dec. 22, 2011

(65) Prior Publication Data
US 2012/0186920 A1      Jul. 26, 2012

(51) Int. Cl.
*F16F 15/03* (2006.01)

(52) U.S. Cl.
USPC .................................. 188/267; 280/124.108

(58) Field of Classification Search
USPC ............. 188/267, 267.1, 267.2; 280/124.108, 280/5.51
See application file for complete search history.

(56) References Cited

U.S. PATENT DOCUMENTS

| | | | | |
|---|---|---|---|---|
| 4,638,670 A | * | 1/1987 | Moser | 73/658 |
| 4,650,042 A | * | 3/1987 | Knecht et al. | 188/266.6 |
| 5,090,728 A | * | 2/1992 | Yokoya et al. | 280/5.519 |
| 5,296,785 A | * | 3/1994 | Miller | 318/254.1 |
| 5,350,187 A | * | 9/1994 | Shinozaki | 280/124.102 |
| 6,328,144 B1 | * | 12/2001 | Hayakawa et al. | 188/299.1 |
| 2003/0033063 A1 | * | 2/2003 | Kawashima et al. | 701/37 |
| 2007/0170024 A1 | * | 7/2007 | Suda et al. | 188/267 |
| 2009/0224502 A1 | * | 9/2009 | Yamawaki et al. | 280/124.108 |

FOREIGN PATENT DOCUMENTS

| | | |
|---|---|---|
| EP | 2098390 A1 | 9/2009 |
| JP | 2-53289 U | 4/1990 |
| JP | 2002-305434 A | 10/2002 |
| JP | 2004-215375 A | 7/2004 |
| JP | 2007-168685 A | 7/2007 |
| JP | 2008-052516 A | 3/2008 |
| JP | 2009-001203 A | 1/2009 |
| JP | 2009-208589 A | 9/2009 |
| JP | 2009-257486 A | 11/2009 |

* cited by examiner

*Primary Examiner* — Christopher Schwartz
(74) *Attorney, Agent, or Firm* — Sughrue Mion, PLLC

(57) ABSTRACT

An electrical shock absorber 20 of the present embodiment includes a motor 21, which is rotated by approaching and separating motions between sprung and unsprung members which approach and separate from each other; and an electric circuit 50, which connects the electric terminals of the motor 21 so as to cause current to flow through the motor 21. The electric circuit 50 includes P-channel JFETs 56, 60. The gate of the P-channel JFET 56, 60 is connected to one electric terminal of the motor 21, and the source of the P-channel JFET 56, 60 is connected to the other electric terminal of the motor 21. Therefore, the induced voltage is applied to the gate. The induced voltage represents the stroke speed of the electrical shock absorber 20. Therefore, the gate voltage VGS is changed on the basis of the above-mentioned relative speed such that the gate voltage VGS increases with the stroke speed of the electrical shock absorber 20. By means of changing the gate voltage VGS in this manner, the magnitude of the induced current flowing through the electric circuit 50 is limited by the P-channel JFETs 56, 60 on the basis of the characteristic of the P-channel JFET 56, 60 in terms of change of drain-source current iDS with the gate voltage VGS.

8 Claims, 16 Drawing Sheets

ELECTRICAL SHOCK ABSORBER

CROSS REFERENCE TO RELATED APPLICATIONS

This application is a National Stage of International Application No. PCT/JP2010/060701 filed Jun. 17, 2010, the contents of all of which are incorporated herein by reference in their entirety.

TECHNICAL FIELD

The present invention relates to an electrical shock absorber which includes a motor rotated by approaching and separating motions between first and second members that approach and separate from each other, and generates damping force against the approaching and separating motions between the first and second members. In particular, the present invention relates to an electrical shock absorber which is interposed between a sprung member and an unsprung member of a vehicle and which generates damping force against approaching and separating motions between the sprung member and the unsprung member.

BACKGROUND ART

In general, a suspension apparatus of a vehicle includes a shock absorber and a spring member disposed between sprung and unsprung members of the vehicle. The spring member generates elastic force, and the shock absorber generates damping force. The damping force damps vibrations between the sprung member and the unsprung member caused by approaching and separating motions between the sprung member and the unsprung member.

There has been known an electrical shock absorber in which a motor is used. This electrical shock absorber includes a motor which is rotated by approaching and separating motions between sprung and unsprung members which approach and separate from each other; and an electric circuit which connects two electric terminals of the motor so as to cause current to flow through the motor. When the motor is rotated by an approaching motion or separating motion between the sprung member and the unsprung member, an induced voltage appears between the two electric terminals of the motor, and an induced current flows through the motor and the electric circuit. As a result of the induced current flowing through the motor and the electric circuit, there is generated a motor torque which acts in a direction opposite the rotation direction of the motor. Such motor torque is utilized as damping force against the approaching and separating motions between the sprung member and the unsprung member.

An electrical shock absorber described in Japanese Patent Application Laid-Open (kokai) No. 2009-257486 includes a motor, a ball-screw mechanism, and an electric circuit. The motor and the ball-screw mechanism are interposed between first and second members. The ball-screw mechanism extends or contracts as a result of an approaching or separating motion between the first member and the second member, converts the approaching or separating motion to a rotational motion, and transmits the rotational motion to the motor. The electric circuit is connected to two electric terminals of the motor in order to cause an induced current to flow through the motor. The electric circuit includes a resistor element, an inductor, and a capacitor. By use of these elements, the induced current flowing through the electric circuit and the motor is set. A damping force (motor torque) corresponding to the set induced current is obtained.

DISCLOSURE OF THE INVENTION

An electrical shock absorber includes a rotation body, such as a motor, which is rotated by approaching and separating motions between first and second members that approach and separate from each other. In the case where an electrical shock absorber including a rotation body is used in a vehicle, the inertial force of the rotation body influences damping force.

FIG. 14 is a gain diagram showing the frequency characteristic of a displacement transmission ratio, which is a ratio at which a vertical displacement of road surface (input displacement) is transmitted to the sprung member so that the sprung member causes a vertical displacement (sprung displacement). In FIG. 14, a curve A shows the frequency characteristic of the displacement transmission ratio for the case where an electrical shock absorber is used, and a curve B shows the frequency characteristic of the displacement transmission ratio for the case where a shock absorber which generates damping force by making use of viscosity of viscous fluid (hereinafter, such a shock absorber will be referred to as a "conventional shock absorber") is used.

As shown in FIG. 14, for a high-frequency component of an input displacement; for example, a frequency component near an unsprung resonance frequency (e.g., near 10 Hz), the gain represented by the curve A is greater than the gain represented by the curve B. In the case where the gain (the displacement transmission ratio) is large, an input displacement causes a large displacement of the sprung member, whereby the riding quality of the vehicle deteriorates. That is, use of an electrical shock absorber deteriorates the riding quality for a high-frequency component of an input displacement. A possible reason for the deteriorated riding quality is the adverse effect of the inertial force of the rotation body on damping force.

Deterioration of the riding quality for a high-frequency component of an input displacement can be mitigated by means of reducing the magnitude of a sprung displacement caused by the high-frequency component of the input displacement. In this case, the magnitude of the sprung displacement can be reduced by means of reducing the magnitude of damping force generated by the shock absorber.

Also, the high-frequency component of the input displacement causes the sprung member and the unsprung member to approach or separate at high speed. Accordingly, the magnitude of a sprung displacement caused by the high-frequency component of the input displacement can be reduced by means of reducing the magnitude of the damping force when the relative speed between the sprung member and the unsprung member is large. Also, the above-mentioned relative speed is represented by the extension/contraction speed of the shock absorber (hereinafter this extension/contraction speed will be referred to as "stroke speed") in the case where the shock absorber extends and contracts as result of approaching and separating motions between the sprung member and the unsprung member. Therefore, the magnitude of the sprung displacement caused by the high-frequency component of the input displacement can be reduced by means of reducing the magnitude of the damping force when the magnitude of the stroke speed is large.

FIG. 15 is a graph showing a changing characteristic (damping force characteristic) which represents a change in damping force with stroke speed for the case where a typical conventional shock absorber is used. In the graph, the horizontal axis represents stroke speed, and the vertical axis represents damping force. As can be understood from FIG. 15, the greater the stroke speed, the greater the damping force. Furthermore, the damping force characteristic changes at a threshold speed S*. When the magnitude of stroke speed is equal to or less than the threshold speed S*, the ratio of increase in damping force to increase in stroke speed is large, and, when the magnitude of stroke speed is greater than the threshold speed S*, the ratio of increase in damping force to increase in stroke speed is small. Therefore, when a conventional shock absorber is used, the magnitude of damping force can be suppressed in a high stroke speed region. Accordingly, the magnitude of a sprung displacement caused by a high-frequency component of an input displacement can be reduced.

FIG. 16 is a graph showing a damping force characteristic for the case where a typical electrical shock absorber is used. As can be understood from FIG. 16, when an electrical shock absorber is used, the ratio of increase in damping force to increase in stroke speed is constant in both a high stroke speed region and a low stroke speed region. That is, when a typical electrical shock absorber is used, the damping force characteristic is constant at all times. Therefore, the magnitude of a sprung displacement caused by a high-frequency component of an input displacement cannot be reduced.

As shown in the above-described example, changing the damping force characteristic in accordance with the relative speed between the first and second members repeating approaching and separating motions (in accordance with the stroke speed) is required in various situations. However, in the case where a typical electrical shock absorber is used, since the damping force characteristic is constant over the entire stroke speed region, difficulty is encountered in properly coping with such a situation.

The present invention has been accomplished so as to solve the above-described problems, and its object is to provide an electrical shock absorber which generates damping force against approaching and separating motions between first and second members and which is configured to change its damping force characteristic in accordance with relative speed between the first and second members.

An electrical shock absorber of the present invention includes a motor which is rotated by approaching and separating motions between first and second members which approach and separate from each other; and an electric circuit which connects two electric terminals provided on the motor so as to cause current to flow through the motor. When the motor is rotated by an approaching motion or separating motion between the first and second members, an induced voltage appears between the two electric terminals, and an induced current flows through the motor and the electric circuit. As a result, the electrical shock absorber generates a damping force against the approaching motion or separating motion between the first and second members. A field effect transistor is provided in the electric circuit. This field effect transistor is connected to the electric circuit such that the induced current flowing through the electric circuit can flow through a drain-source path of the field effect transistor. The field effect transistor limits or controls the magnitude of the induced current flowing through the electric circuit on the basis of a characteristic of the field effect transistor in terms of change of a drain-source current iDS with a gate voltage VGS which is applied to the field effect transistor and is changed on the basis of relative speed between the first member and the second member.

According to the electrical shock absorber of the present invention, since a field effect transistor (hereinafter may be referred to as an "FET") is provided in the electric circuit, the magnitude of the induced current flowing through the electric current is limited when the magnitude of the induced current is greater than the drain-source current iDS, which is a current which can be caused to flow between the drain and source of the field effect transistor. The drain-source current iDS changes with the gate voltage VGS. In the present invention, by means of changing the gate voltage on the basis of the relative speed between the first member and the second member, the magnitude of the induced current flowing through the electric circuit is limited in accordance with the characteristic of the field effect transistor in terms of change of the drain-source current iDS with the gate voltage VGS.

The magnitude of the induced current flowing through the electric circuit represents the magnitude of the damping force generated by the motor. Therefore, when the magnitude of the induced current flowing through the electric circuit is limited, the magnitude of the damping force which can be generated normally is limited. As a result, in the case where the magnitude of the induced current flowing through the electric circuit is limited, there can be obtained a damping force characteristic different from that attained in the case where the magnitude of the induced current is not limited. In this manner, the damping force characteristic can be changed on the basis of the relative speed between the first member and the second member.

Preferably, the gate voltage VGS is changed on the basis of the magnitude of the induced voltage. In this case, preferably, the gate of the field effect transistor is connected to the electric circuit such that the gate voltage VGS changes on the basis of the magnitude of the induced voltage. More preferably, the gate of the field effect transistor is connected to the electric circuit such that the induced voltage is applied to the gate of the field effect transistor.

The magnitude of the induced voltage appearing between the electric terminals of the motor rotated by approaching and separating motions between the first member and the second member represents the magnitude of the relative speed between the first member and the second member. Therefore, by means of changing the gate voltage VGS on the basis of the magnitude of the induced voltage, the gate voltage VGS can be changed on the basis of the relative speed.

Preferably, the electric circuit includes a first connection path in which the field effect transistor is provided, and a second connection path in which a resistor element is provided and which is connected in parallel to the first connection path.

In this case, preferably, a resistor element is provided in the first connection path, and the field effect transistor limits the magnitude of the current flowing through the first connection path on the basis of the characteristic of the field effect transistor in terms of change of the drain-source current iDS with the gate voltage VGS.

In such a circuit configuration, the induced current flowing through the electric circuit is represented by the sum of the current flowing through the first connection path and the current flowing through the second connection path. By means of limiting the magnitude of the current flowing through the first connection path on the basis of the electrical characteristic of the field effect transistor (the characteristic in terms of change of the drain-source current iDS with the gate voltage VGS), the damping force characteristic can be changed properly on the basis of the relative speed between the first member and the second member. The required damping force can be secured by the current flowing through the second connection path.

In the case where a resistor element is provided in the first connection path, a current (reference current) to flow through the first connection path is determined by the resistance of that resistor element and the induced voltage. This reference current changes in proportion to the induced voltage. Therefore, the greater the magnitude of the relative speed between the first member and the second member represented by the induced voltage, the greater the reference current. When the magnitude of the reference current is greater than the drain-source current iDS of the FET provided in the first connection path, the magnitude of the current flowing through the first connection path is limited. Accordingly, when the induced voltage is high; i.e., when the magnitude of the relative speed between the first member and the second member is large, the magnitude of the current flowing through the first connection path is limited, whereby the magnitude of damping force is suppressed. Therefore, the magnitude of damping force against a high-frequency component of an input displacement can be suppressed, whereby riding quality can be improved.

Preferably, the electric circuit includes a first electric circuit through which a current flows when the motor rotates in one direction as a result of an approaching motion between the first member and the second member, and a second electric circuit through which a current flows when the motor rotates in the other direction as a result of a separating motion between the first member and the second member; and the field effect transistor is provided in each of the first electric circuit and the second electric circuit.

By means of providing an FET in the first electric circuit through which a current flows during an approaching motion between the first member and the second member, and changing the gate voltage VGS of the FET on the basis of the relative speed between the first member and the second member during the approaching motion, the damping force characteristic during the approaching motion can be changed. Similarly, by means of providing an FET in the second electric circuit through which a current flows during a separating motion between the first member and the second member, and changing the gate voltage VGS of the FET on the basis of the relative speed between the first member and the second member during the separating motion, the damping force characteristic during the separating motion can be changed. As described above, according to the present invention, the damping force characteristic can be changed individually for each of the approaching motion and the separating motion.

In this case, preferably, the first electric circuit includes an eleventh connection path in which the field effect transistor is provided and a twelfth connection path in which a resistor element is provided and which is connected in parallel to the eleventh connection path; and the second electric circuit includes a twenty-first connection path in which the field effect transistor is provided and a twenty-second connection path in which a resistor element is provided and which is connected in parallel to the twenty-first connection path. By virtue of this configuration, the damping force characteristic can be changed properly in accordance with each of approaching and separating motions between the first member and the second member.

Preferably, a resistor element is provided in each of the eleventh connection path and the twenty-first connection path; the field effect transistor provided in the eleventh connection path limits the magnitude of the current flowing through the eleventh connection path on the basis of the characteristic of the field effect transistor in terms of change of the drain-source current iDS with the gate voltage VGS; and the field effect transistor provided in the twenty-first connection path limits the magnitude of the current flowing through the twenty-first connection path on the basis of the characteristic of the field effect transistor in terms of change of the drain-source current iDS with the gate voltage VGS. By virtue of this configuration, the magnitude of the damping force against a high-frequency component of an input displacement can be suppressed independently for each of approaching and separating motions of the sprung member, whereby riding quality can be improved further.

Preferably, the field effect transistor is a P-channel junction field effect transistor. The P-channel junction field effect transistor has an electrical characteristic such that the magnitude of the drain-source current iDS decreases as the magnitude of the gate voltage VGS increases. Therefore, by means of providing a P-channel junction field effect transistor in the electric circuit and increasing the gate voltage VGS in accordance with the relative speed between the first member and the second member, the magnitude of the induced current flowing through the electric circuit is limited when the magnitude of the relative speed is large. As a result, the magnitude of the damping force against a high-frequency component of an input displacement is suppressed, whereby riding quality is improved. Furthermore, an electric circuit which achieves such an action and effect can be configured easily.

In the case where a P-channel junction field effect transistor is provided in the electric circuit, preferably, the P-channel junction field effect transistor limits the magnitude of the induced current flowing through the electric circuit in accordance with the gate voltage VGS which is increased with the relative speed between the first member and the second member, as well as in accordance with an electric characteristic in terms of change of the drain-source current iDS with the gate voltage VGS. In this case, preferably, the gate of the P-channel junction field effect transistor is connected to the electric circuit such that the gate voltage VGS increases with the induced voltage. More preferably, the gate of the P-channel junction field effect transistor is connected to the electric circuit such that the induced voltage is applied to the gate of the P-channel junction field effect transistor.

MODE FOR CARRYING OUT THE INVENTION

An embodiment of the present invention will now be described.

Figure 1:
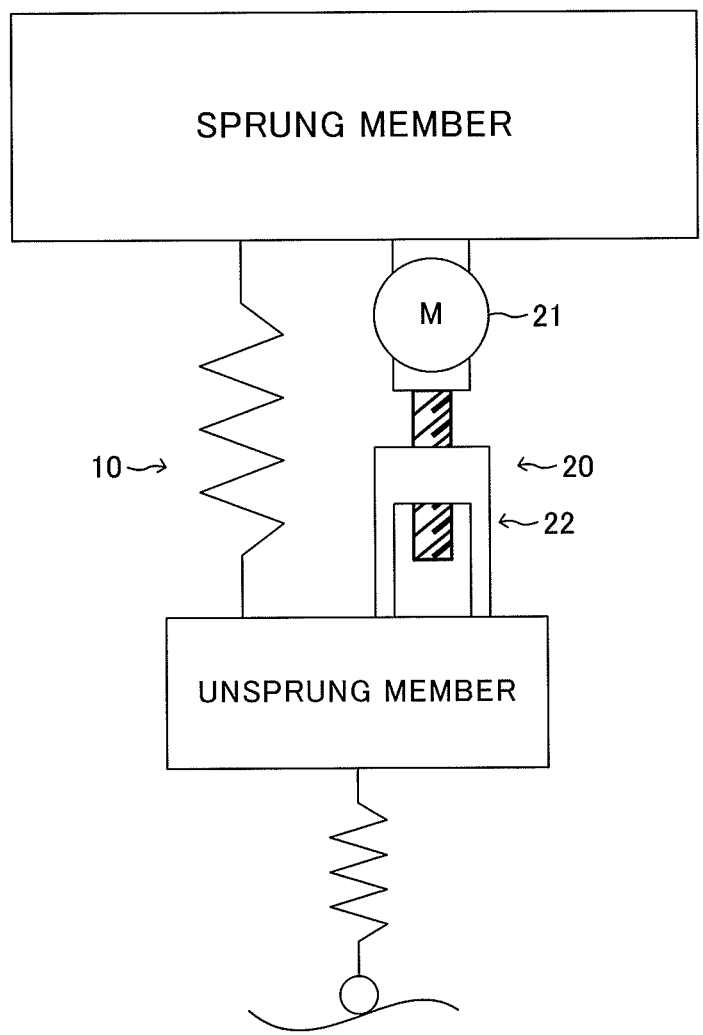
FIG. 1 is a schematic view of a vehicular suspension apparatus which includes an electrical shock absorber according to an embodiment of the present invention.

FIG. 1 is a schematic view of a vehicular suspension apparatus which includes an electrical shock absorber according to the present embodiment. This suspension apparatus includes a spring member 10 and an electrical shock absorber 20. The spring member 10 is provided between a vehicle body and a lower arm or the like connected to a wheel. A member located above the spring member 10; i.e., a member on the vehicle body side, will be referred to as a "sprung member," and a member located below the spring member 10; i.e., a member on the wheel side, will be referred to as an "unsprung member."

Furthermore, the electrical shock absorber 20 is interposed between the sprung member and the unsprung member in parallel with the spring member 10. The spring member 10 generates elastic force, and the electrical shock absorber 20 generates damping force.

Figure 2:
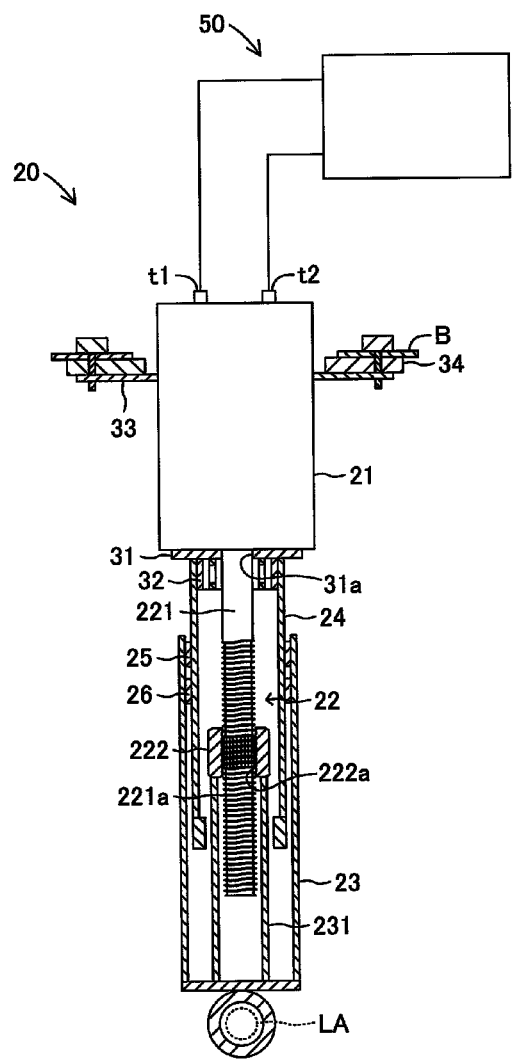
FIG. 2 is a schematic view of the electrical shock absorber according to the present embodiment.

FIG. 2 is a schematic diagram of the electrical shock absorber 20. As shown in FIG. 2, this electrical shock absorber 20 includes a motor 21, a ball-screw mechanism 22, an outer cylinder 23, an inner cylinder 24, and an electric circuit 50.

The outer cylinder 23 assumes the form of a bottomed cylinder, and is connected to a lower arm LA (the unsprung member side) via a lower bottom wall portion thereof. The inner cylinder 24 is coaxially disposed inside the outer cylinder 23. The inner cylinder 24 is supported by bearings 25 and 26 attached to the inner circumference of the outer cylinder 23 such that the inner cylinder 24 is movable in the axis direction of the outer cylinder 23.

The ball-screw mechanism 22 is provided inside the inner cylinder 24. The ball-screw mechanism 22 includes a ball screw shaft 221 and a ball screw nut 222. The ball screw shaft 221 is coaxially disposed inside the inner cylinder 24. The ball screw nut 222 has a female thread portion 222a, which is in screw engagement with a male thread portion 221a formed on the ball screw shaft 221. The lower end of the ball screw nut 222 is fixed to a nut support tube 231 extending upward from the bottom wall of the outer cylinder 23.

The upper end of the inner cylinder 24 is fixed to an attachment plate 31. The attachment plate 31 is fixed to a lower portion of the motor 21. The attachment plate 31 has a through hole 31a formed at the center thereof, and the ball screw shaft 221 extends through the through hole 31a. The ball screw shaft 221 is inserted into the motor 21 via the through hole 31a, and is connected to a rotor (not shown) of the motor 21 inside the motor 21. The ball screw shaft 221 is rotatably supported by a bearing 32 disposed within the inner cylinder 24.

In the present embodiment, the motor 21 is a DC motor. The motor 21 includes a rotor having a coil and a stator having a permanent magnet, and is configured such that the rotor rotates in relation to the stator. The motor 21 has a first electric terminal t1 and a second electric terminal t2 provided for supplying current to the motor 21. The first electric terminals t1 and the second electric terminal t2 are electrically connected together within the motor 21 via the coil. Furthermore, the first electric terminal t1 and the second electric terminal t2 are externally connected to the electric circuit 50.

An attachment bracket 33 is connected to the motor 21. An upper support 34 formed of an elastic material and connected to a vehicle body B (sprung member) is attached to the upper surface of the attachment bracket 33.

In the suspension apparatus having the above-described structure, when the sprung member and the unsprung member approach or separate from each other because of a vertical displacement of a road surface on which the vehicle is traveling, the spring member 10 and the electrical shock absorber 20 contract or extend. Through extension and contraction of the spring member 10, a shock which the sprung member receives from the road surface is absorbed. Moreover, as a result of extension or contraction of the electrical shock absorber 20, the outer cylinder 23 moves axially in relation to the inner cylinder 24. The relative axial movement of the outer cylinder 23 causes the ball screw nut 222 to move along the axial direction of the ball screw shaft 221. As a result of the relative axial movement of the ball screw nut 222, the ball screw shaft 221 rotates. The rotational motion of the ball screw shaft 221 is transmitted to the motor 21, whereby the motor 21 (specifically, the rotor of the motor 21) is rotated. As can be understood from such operation, the ball-screw mechanism 22 is a motion conversion mechanism which contracts or extends as result of an approaching or separating motion between the sprung member and the unsprung member, converts the approaching or separating motion to a rotational motion, and transmits the rotational motion to the motor 21.

In the case where the motor 21 (its rotor) is rotated as a result of an approaching motion or a separating motion between the sprung member and the unsprung member, the coil of the rotor of the motor 21 crosses a magnetic flux generated from the permanent magnet of the stator, whereby an induced voltage appears between the first electric terminal t1 and the second electric terminal t2. As a result of generation of the induced voltage, an induced current (generated current) flows through the motor 21 and the electric circuit 50 externally connected to the electric terminals of the motor 21. This induced current causes the motor 21 to generate a motor torque which acts in a direction opposite the rotation direction of the rotor; i.e., in a direction for stopping the rotation of the rotor. Such motor torque acts on the sprung member and the unsprung member via the ball-screw mechanism 22 as a damping force against the approaching and separating motions between the sprung member and the unsprung member. This damping force damps vibration generated between the sprung member and the unsprung member.

Figure 3:
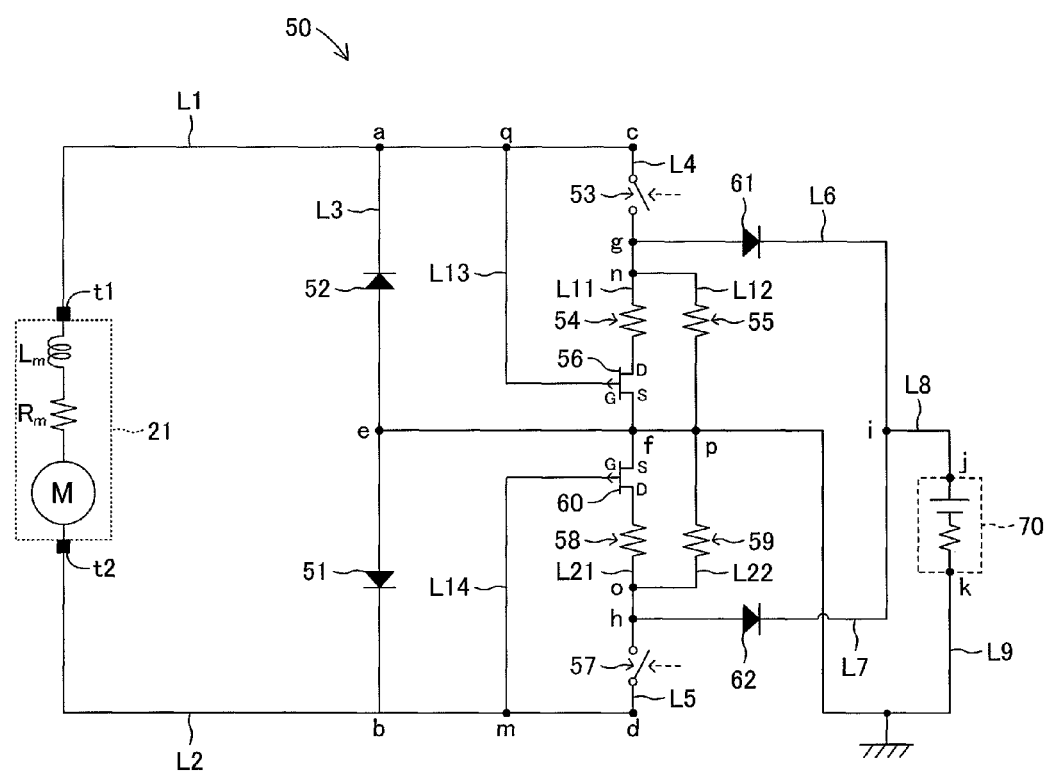
FIG. 3 is a diagram representing an electric circuit according to the present embodiment.

FIG. 3 is a diagram showing the electric circuit 50 according to the present embodiment. As shown in FIG. 3, the electric circuit 50 electrically and externally connects together the two electric terminals (the first electric terminal t1 and the second electric terminal t2) of the motor 21 in order to cause the induced current to flow through the motor 21. An induced current flows through this electric circuit 50 when an induced voltage is generated as a result of the motor 21 being rotated by an approaching or separating motion between the sprung member and the unsprung member. In the drawing, Rm represents an internal resistance of the motor 21, and Lm represents an inductance of the coil of the motor 21 (motor inductance).

The electric circuit 50 includes a first electric path L1 electrically connected to the first electric terminal t1 of the motor 21, and a second electric path L2 electrically connected to the second electric terminal t2 of the motor 21. Furthermore, the electric circuit 50 includes a third electric path L3 which establishes connection between a point a on the first electric path L1 and a point b on the second electric path L2.

A first diode 51 and a second diode 52 are provided in the third electric path L3. The first diode 51 is provided between points e and b on the third electric path L3, and the second diode 52 is provided between the points e and a on the third electric path L3. The first diode 51 permits flow of current from the point e toward the point b, and prohibits flow of current from the point b toward the point e. The second diode 52 permits flow of current from the point e toward the point a, and prohibits flow of current from the point a toward the point e.

A fourth electric path L4 is connected to the first electric path L1 at a point c. A first switch 53 is provided in the fourth electric path L4. The first switch 53 opens and closes the fourth electric path L4. The first switch 53 is duty-controlled in accordance with a control signal from, for example, an electronic control unit.

A fifth electric path L5 is connected to the second electric path L2 at a point d. A second switch 57 is provided in the fifth electric path L5. The second switch 57 opens and closes the fifth electric path L5. The second switch 57 is duty-controlled in accordance with a control signal from, for example, an electronic control unit. Notably, these switches 53 and 57 may be omitted.

A sixth electric path L6 is connected to the fourth electric path L4 at a point g. Also, a seventh electric path L7 is connected to the fifth electric path L5 at a point h. The sixth electric path L6 and the seventh electric path L7 merge at a point i. A third diode 61 provided in the sixth electric path L6 permits flow of current from the point g toward the point i, and prohibits flow of current from the point i toward the point g. A fourth diode 62 provided in the seventh electric path L7 permits flow of current from the point h toward the point i, and prohibits flow of current from the point i toward the point h.

Furthermore, an eighth electric path L8 is connected to the point i. The positive electrode j of a power storage device 70 such as a car battery is connected to the eighth electric path L8. A grounded ninth electric path L9 is connected to the negative electrode k of the power storage device 70. The ninth electric path L9 is connected to the third electric path L3 at the point e.

An eleventh electric path L11 and a twenty-first electric path L21 are connected to the ninth electric path L9 at a point f. The eleventh electric path L11 is connected to the fourth electric path L4 at a point n. The twenty-first electric path L21 is connected to the fifth electric path L5 at a point o. Furthermore, a twelfth electric path L12 and a twenty-second electric path L22 are connected to the ninth electric path L9 at a point p. The twelfth electric path L12 is connected to the fourth electric path L4 at the point n, and the twenty-second electric path L22 is connected to the fifth electric path L5 at the point o. As can be understood from such a configuration, the twelfth electric path L12 is connected in parallel to the eleventh electric path L11, and the twenty-second electric path L22 is connected in parallel to the twenty-first electric path L21.

An eleventh resistor element 54 and a first P-channel junction field effect transistor (hereinafter, referred to as a P-channel JFET) 56 are provided in the eleventh electric path L11. A twelfth resistor element 55 is provided in the twelfth electric path L12. A twenty-first resistor element 58 and a second P-channel JFET 60 are provided in the twenty-first electric path L21. A twenty-second resistor element 59 is provided in the twenty-second electric path L22. The eleventh electric path L11 corresponds to the first connection path and the eleventh connection path of the present invention. The twelfth electric path L12 corresponds to the second connection path and the twelfth connection path of the present invention. The twenty-first electric path L21 corresponds to the first connection path and the twenty-first connection path of the present invention. The twenty-second electric path L22 corresponds to the second connection path and the twenty-second connection path of the present invention.

The first P-channel JFET 56 is disposed in the eleventh electric path L11 such that its drain is connected to the side toward the point n and its source is connected to the side toward the point f. The second P-channel JFET 60 is disposed in the twenty-first electric path L21 such that its drain is connected to the side toward the point o and its source is connected to the side toward the point f.

A thirteenth electric path L13 is connected to the gate of the first P-channel JFET 56. This thirteenth electric path L13 is connected to the first electric path L1 at a point q shown in FIG. 3. A fourteenth electric path L14 is connected to the gate of the second P-channel JFET 60. This fourteenth electric path L14 is connected to the second electric path L2 at a point m shown in FIG. 3.

How the induced current flows within the electric circuit 50 will be now descried. In the case where the electrical shock absorber 20 extends or contracts and the motor 21 rotates as a result of an approaching or separating motion between the sprung member and the unsprung member, an induced voltage appears between the first electric terminal t1 and the second electric terminal t2 of the motor 21. The induced voltage causes an induced current to flow through the motor 21 and the electric circuit 50.

The polarity of the induced voltage changes depending on whether the electrical shock absorber 20 is extended or compressed. For example, in the case where the sprung member and the unsprung member approach whereby the electrical shock absorber 20 is compressed and the motor 21 rotates in one direction, the induced voltage appears such that the first electric terminal t1 of the motor 21 assumes a high potential, and the second electric terminal t2 thereof assumes a low potential. In contrast, in the case where the sprung member and the unsprung member separate whereby the electrical shock absorber 20 is extended and the motor 21 rotates in the other direction, the induced voltage appears such that the second electric terminal t2 of the motor 21 assumes a high potential, and the first electric terminal t1 thereof assumes a low potential.

Accordingly, when the electrical shock absorber 20 is compressed, the induced current flows from the first electric terminal t1 of the motor 21 to the second electric terminal t2 thereof while passing through the points c, f, e, and b in the electric circuit 50, in this sequence. That is, the induced current flows through a first electric circuit cfeb which connects the points c, f, e, and b. Furthermore, when the electrical shock absorber 20 is extended, the induced current flows from the second electric terminal t2 of the motor 21 to the first electric terminal t1 thereof while passing through the points d, f, e, and a in the electric circuit 50, in this sequence. That is, the induced current flows through a second electric circuit dfea which connects the points d, f, e, and a.

As described above, depending on whether the electrical shock absorber 20 is compressed or extended, the induced current flows through a different path within the electric circuit 50.

In the case where the induced voltage generated by the motor 21 exceeds the output voltage (power storage voltage) of the power storage device 70, a portion of electric power generated by the motor 21 is stored in the power storage device 70 (regeneration operation). For example, when the electrical shock absorber 20 is compressed, the induced current branches into two currents at the position g. One of the currents flows through the first electric circuit cfeb, and the other current flows through the sixth electric path L6 and the eighth electric path L8. The power storage device 70 is charged by the induced current flowing through the sixth electric path L6 and the eighth electric path L8. Also, when the electrical shock absorber 20 is extended, the induced current branches into two currents at the position h. One of the currents flows through the second electric circuit dfea, and the other current flows through the seventh electric path L7 and the eighth electric path L8. The power storage device 70 is charged by the induced current flowing through the seventh electric path L7 and the eighth electric path L8.

The induced current flowing through the first electric circuit cfeb is divided, at the point n, into a current flowing through the eleventh electric path L11 and a current flowing through the twelfth electric path L12, which is connected in parallel to the eleventh electric path L11.

In principle, the magnitude of current to flow through the eleventh electric path L11 is determined by the induced voltage and the resistance of the eleventh resistor element 54. In the case where the duty ratio of the switch 53 is 100%, this current is represented by V/R11, wherein V represents the induced voltage [volt], and R11 represents the resistance [Ω] of the eleventh resistor element 54. However, since the first P-channel JFET 56 is disposed in the eleventh electric path L11, when the magnitude of current flowing through the eleventh electric path L11 is greater than a current which can be caused to flow between the drain and source (drain-source current) of the first P-channel JFET 56, the first P-channel JFET 56 limits the magnitude of the current flowing through the eleventh electric path L11.

The gate of the first P-channel JFET 56 is connected to the first electric terminal t1 of the motor 21 via the thirteenth electric path L13 and the first electric path L1. The source of the first P-channel JFET 56 is connected to the second electric terminal t2 of the motor 21 via the ninth electric path L9, the third electric path L3, and the second electric path L2. Accordingly, the induced voltage is applied to the gate of the first P-channel JFET 56. Therefore, the gate voltage (gate to source voltage) VGS of the first P-channel JFET 56 is changed in accordance with the magnitude of the induced voltage. The induced voltage is represented by the product of a motor torque constant of the motor 21 and the rotational angular velocity of the motor 21. The rotational angular velocity of the motor 21 represents the stroke speed of the electrical shock absorber 20. Accordingly, the gate voltage VGS of the first P-channel JFET 56 is changed on the basis of the magnitude of the stroke speed such that the gate voltage VGS increases with the stroke speed.

Figure 4:
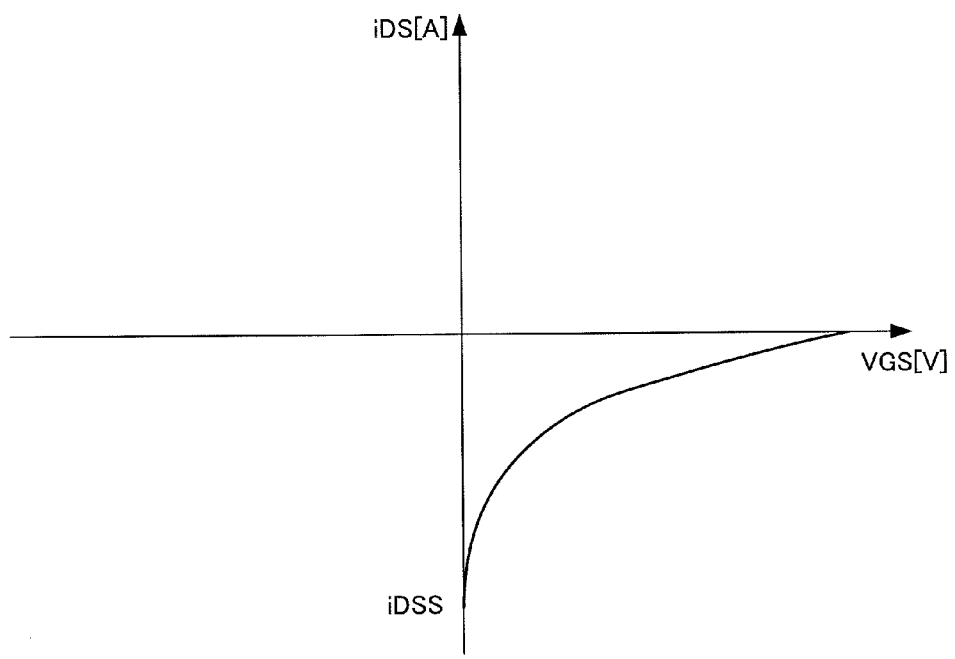
FIG. 4 is a graph showing the electrical characteristic of a P-channel junction field effect transistor.

FIG. 4 is a graph showing an electrical characteristic (characteristic in terms of change of the drain-source current iDS with the gate voltage VGS) of a typical P-channel JFET. In the graph, the horizontal axis represents the gate voltage VGS, and the vertical axis represents the drain-source current iDS. Notably, a drain-source current which flows from the source to the drain is represented as a positive current, and a drain-source current which flows from the drain to the source is represented as a negative current. As can be understood from the drawing, the P-channel JFET has an electrical characteristic such that the magnitude (absolute value) of the drain-source current iDS decreases as the gate voltage VGS increases. Accordingly, the first P-channel JFET 56 has an electrical characteristic such that the higher the induced voltage V, the smaller the drain-source current.

Figure 5:
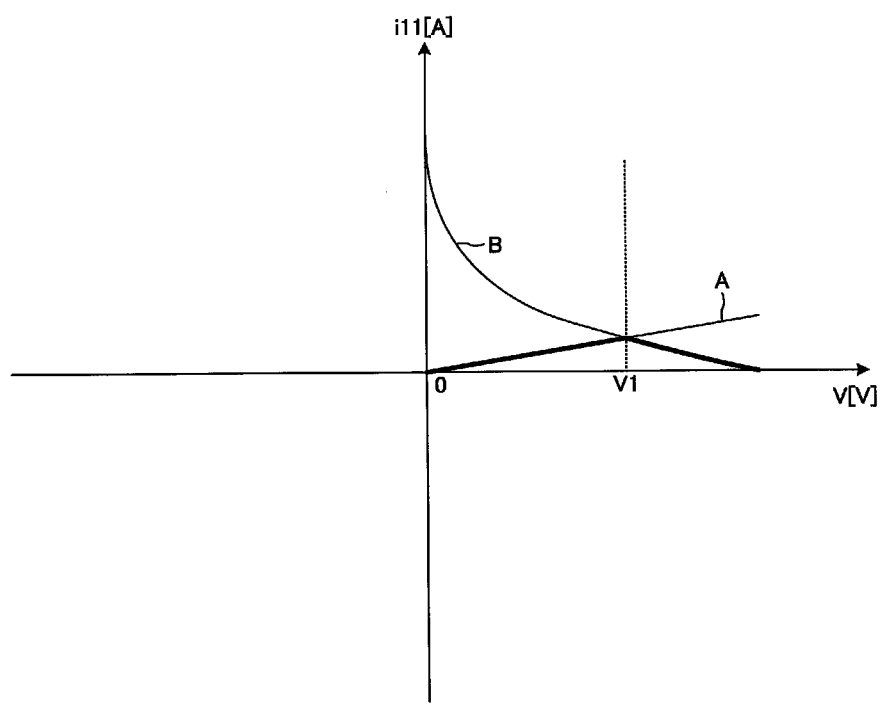
FIG. 5 is a graph showing the relation between induced voltage and current flowing through an eleventh electric path.

FIG. 5 is a graph showing the relation between induced voltage V and current i11 flowing through the eleventh electric path L11. In the graph, the horizontal axis represents the induced voltage V [V], and the vertical axis represents the current i11 flowing through the eleventh electric path L11. In the graph, a thick line represents a change in the current i11 with the induced voltage V. A line A represents a change in a current (first reference current) i1\*, which is determined from the induced voltage V and the resistance R11 of the eleventh resistor element 54, with the induced voltage V. The first reference current i1\* is represented by V/R11. A line B represents a change in the drain-source current iDS1 which can flow through the first P-channel JFET 56 with the induced voltage V (=the gate voltage VGS); i.e., the electrical characteristic of the first P-channel JFET 56. In the following description, the drain-source current which can flow through the first P-channel JFET 56 will be referred to as the "first limit current."

As can be understood from the line A, the first reference current i1\* increases in proportion with the induced voltage V. Meanwhile, as can be understood from the line B, the higher the induced voltage V, the smaller the first limit current iDS1. When the magnitude of the induced voltage V is equal to a threshold voltage V1, the magnitude of the first reference current i1\* becomes equal to the magnitude of the first limit current iDS1. When the magnitude of the induced voltage V is equal to or less than the threshold voltage V1, the magnitude of the first reference current i1\* is equal to or less than the magnitude of the first limit current iDS1. In this case, the first reference current i1\* flows through the eleventh electric path L11. When the magnitude of the induced voltage V is greater than the threshold voltage V1, since the magnitude of the first reference current i1\* is greater than the magnitude of the first limit current iDS1, the magnitude of the current flowing through the eleventh electric path L11 is restricted by the first P-channel JFET 56. In this case, a current which is equal in magnitude to the first limit current iDS1 flows through the eleventh electric path L11. As a result, the change in the current i11 flowing through the eleventh electric path L11 with the induced voltage V is represented by the thick line in the graph. As can be understood from this changing characteristic, when the magnitude of the induced voltage V is small (equal to or less than the threshold voltage V1), the magnitude of the current i11 is not limited. When the magnitude of the induced voltage V is large (greater than the threshold voltage V1), the magnitude of the current i11 is limited by the first P-channel JFET 56 on the basis of the electrical characteristic (characteristic in terms of change of the drain-source current iDS with the gate voltage VGS) of the first P-channel JFET 56; that is, on the basis of the first limit current iDS1.

Figure 6:
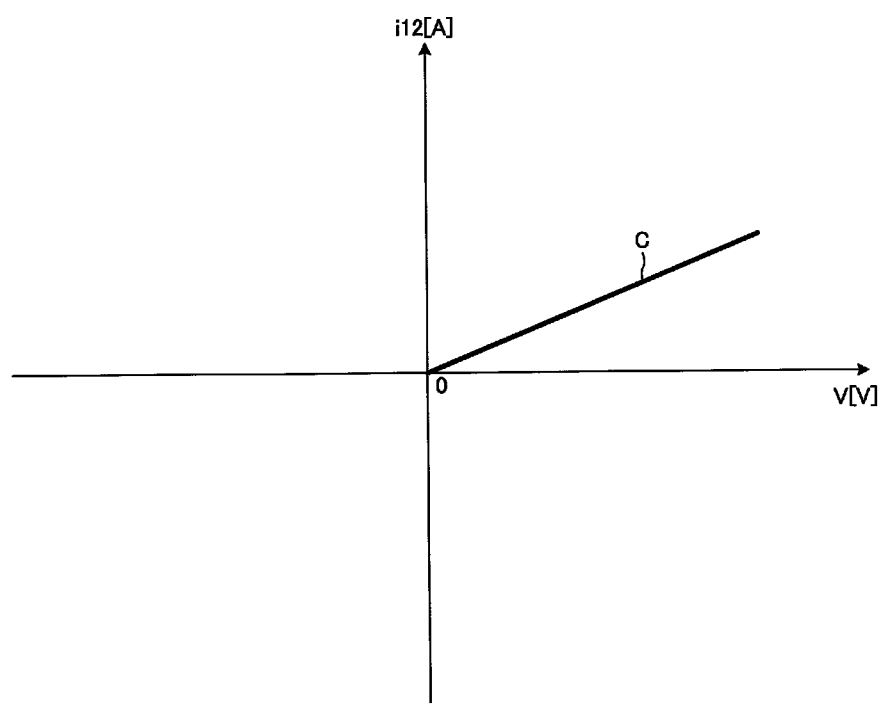
FIG. 6 is a graph showing the relation between induced voltage and current flowing through a twelfth electric path.

FIG. 6 is a graph showing the relation between induced voltage V and current i12 flowing through the twelfth electric path L12. In the graph, the horizontal axis represents the induced voltage V [V], and the vertical axis represents the current i12 flowing through the twelfth electric path L12. A change in the current i12 with the induced voltage V is represented by a line C in the graph. In the case where the duty ratio of the switch 53 is 100%, the current i12 is represented by V/R12, wherein V represents the induced voltage [volt], and R12 represents the resistance [Ω] of the twelfth resistor element 55. As can be understood from the graph, the current i12 increases in proportion to the induced voltage V.

The induced current i1 flowing through the first electric circuit cfeb during an approaching motion between the sprung member and the unsprung member (i.e., when the electrical shock absorber 20 is compressed) is represented by the sum of the current i11 flowing through the eleventh electric path L11 and the current i12 flowing through the twelfth electric path L12.

Figure 7:
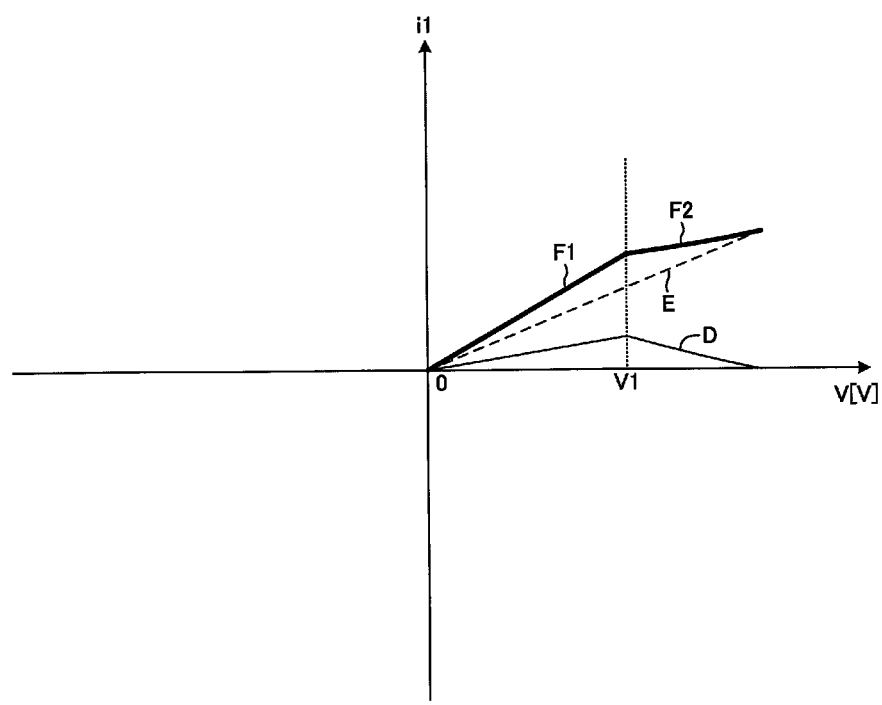
FIG. 7 is a graph showing the relation between induced voltage and current flowing through a first electric circuit.

FIG. 7 is a graph showing the relation between induced voltage V and current i1 flowing through the first electric circuit cfeb. In the graph, a thick line represents a change in the current i1 with the induced voltage V. Furthermore, a line D represents a change in the current i11 flowing through the eleventh electric path L11 with the induced voltage V, and a line E represents a change in the current i12 flowing through the twelfth electric path L12 with the induced voltage V.

As described above, when the magnitude of the induced voltage V is equal to or less than the threshold voltage V1, the first reference current i1* flows through the eleventh electric path L11. Therefore, in this case, a current equal to the sum of the first reference current i1* and the current i12 flowing through the twelfth electric path L12 flows through the first electric circuit cfeb. This changing characteristic of the current with the induced voltage V is represented by a portion F1 of the thick line in the graph. Meanwhile, when the magnitude of the induced voltage V is greater than the threshold voltage V1, the magnitude of the current flowing through the eleventh electric path L11 is limited by the first P-channel JFET 56, whereby a current which is equal in magnitude to the first limit current iDS1 flows through the eleventh electric path L11. Therefore, when the magnitude of the induced voltage V is greater than the threshold voltage V1, a current equal to the sum of the first limit current iDS1 and the current i12 flowing through the twelfth electric path L12 flows through the first electric circuit cfeb. This changing characteristic of the current with the induced voltage V is represented by a portion F2 of the thick line in the graph.

As can be understood from FIG. 7, in the case where a current flows through the first electric circuit cfeb, the changing characteristic of the current i1 with the induced voltage V changes at the threshold voltage V1. When the magnitude of the induced voltage V is equal to or less than the threshold voltage V1, the magnitude of the current i11, which is a portion of the current i1, is not limited by the first P-channel JFET 56. Therefore, the rate of change of the current i1 with the induced voltage V at that time; i.e., the inclination of the portion F1, is large. Meanwhile, when the magnitude of the induced voltage V is greater than the threshold voltage V1, the magnitude of the current i11, which is a portion of the current i1, is limited by the first P-channel JFET 56 on the basis of the electrical characteristic of the first P-channel JFET 56. Therefore, the rate of change of the current i1 with the induced voltage V at that time; i.e., the inclination of the portion F2, is small.

As shown in FIG. 3, the induced current flowing through the second electric circuit dfea is divided, at the point o, into a current flowing through the twenty-first electric path L21 and a current flowing through the twenty-second electric path L22, which is connected in parallel to the twenty-first electric path L21.

In principle, the magnitude of current to flow through the twenty-first electric path L21 is determined by the induced voltage and the resistance of the twenty-first resistor element 58. In the case where the duty ratio of the switch 57 is 100%, this current is represented by V/R21, wherein V represents the induced voltage [volt], and R21 represents the resistance [Ω] of the twenty-first resistor element 58. However, since the second P-channel JFET 60 is disposed in the twenty-first electric path L21, when the magnitude of current flowing through the twenty-first electric path L21 is greater than a current which can be caused to flow between the drain and source (drain-source current) of the second P-channel JFET 60, the second P-channel JFET 60 limits the magnitude of the current flowing through the twenty-first electric path L21.

The gate of the second P-channel JFET 60 is connected to the second electric terminal t2 of the motor 21 via the fourteenth electric path L14 and the second electric path L2. The source of the second P-channel JFET 60 is connected to the first electric terminal t1 of the motor 21 via the ninth electric path L9, the third electric path L3, and the first electric path L1. Accordingly, the induced voltage is applied to the gate of the second P-channel JFET 60. Therefore, the gate voltage VGS of the second P-channel JFET 60 is changed in accordance with the magnitude of the induced voltage. As described above, the magnitude of the induced voltage represents the magnitude of the stroke speed of the electrical shock absorber 20. Accordingly, the gate voltage VGS of the second P-channel JFET 60 is changed on the basis of the magnitude of the stroke speed such that the gate voltage VGS increases with the stroke speed.

Figure 8:
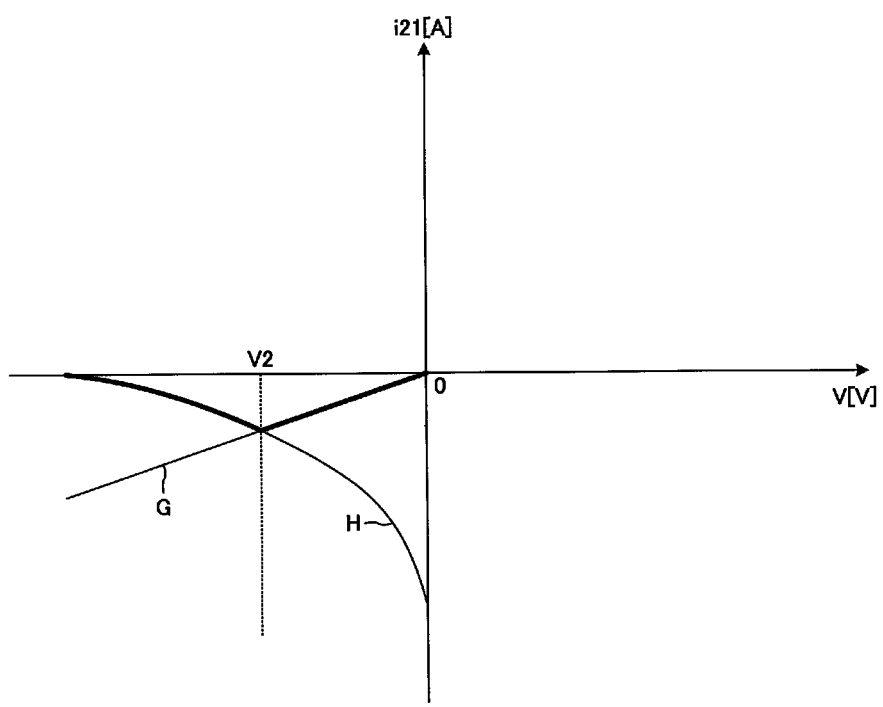
FIG. 8 is a graph showing the relation between induced voltage and current flowing through a twenty-first electric path.

FIG. 8 is a graph showing the relation between induced voltage V and current i21 flowing through the twenty-first electric path L21. In the graph, the horizontal axis represents the induced voltage V [V], and the vertical axis represents the current i21 flowing through the twenty-first electric path L21. In the graph, a thick line represents a change in the current i21 with the induced voltage V. A line G represents a change in a current (second reference current) i2*, which is determined from the induced voltage V and the resistance R21 of the twenty-first resistor element 58, with the induced voltage V. The second reference current i2* is represented by V/R21. A line H represents a change in the drain-source current iDS2 which can flow through the second P-channel JFET 60 with the induced voltage V (=the gate voltage VGS); i.e., the electrical characteristic of the second P-channel JFET 60. In the following description, the drain-source current which can flow through the second P-channel JFET 60 will be referred to as the "second limit current." Notably, the current flowing through the second electric circuit dfea is represented by a negative value. Furthermore, the induced voltage V generated when a current flows through the second electric circuit dfea is represented by a negative value.

As can be understood from the line G in the graph, the second reference current i2* increases (in the negative direction) in proportion with an increase (in the negative direction) of the induced voltage V. Meanwhile, as can be understood from the line H in the graph, the higher the induced voltage V, the smaller the second limit current iDS2. When the magnitude of the induced voltage V is equal to a threshold voltage V2, the magnitude of the second reference current i2* becomes equal to the magnitude of the second limit current iDS2. When the magnitude of the induced voltage V is equal to or less than the threshold voltage V2, the magnitude of the second reference current i2* is equal to or less than the magnitude of the second limit current iDS2. In this case, the second reference current i2* flows through the twenty-first electric path L21. When the magnitude of the induced voltage V is greater than the threshold voltage V2, since the magnitude of the second reference current i2* is greater than the magnitude of the second limit current iDS2, the magnitude of the current flowing through the twenty-first electric path L21 is restricted by the second P-channel JFET 60. In this case, a current which is equal in magnitude to the second limit current iDS2 flows through the twenty-first electric path L21. As a result, the change in the current i21 flowing through the twenty-first electric path L21 with the induced voltage V is represented by the thick line in the graph. As can be understood from this changing characteristic, when the magnitude of the induced voltage V is small (equal to or less than the threshold voltage V2), the magnitude of the current i21 is not limited. When the magnitude of the induced voltage V is large (greater than the threshold voltage V2), the magnitude of the current i21 is limited by the second P-channel JFET 60 on the basis of the electrical characteristic (characteristic in terms of change of the drain-source current iDS with the gate voltage VGS) of the second P-channel JFET 60; that is, on the basis of the second limit current iDS2.

Figure 9:
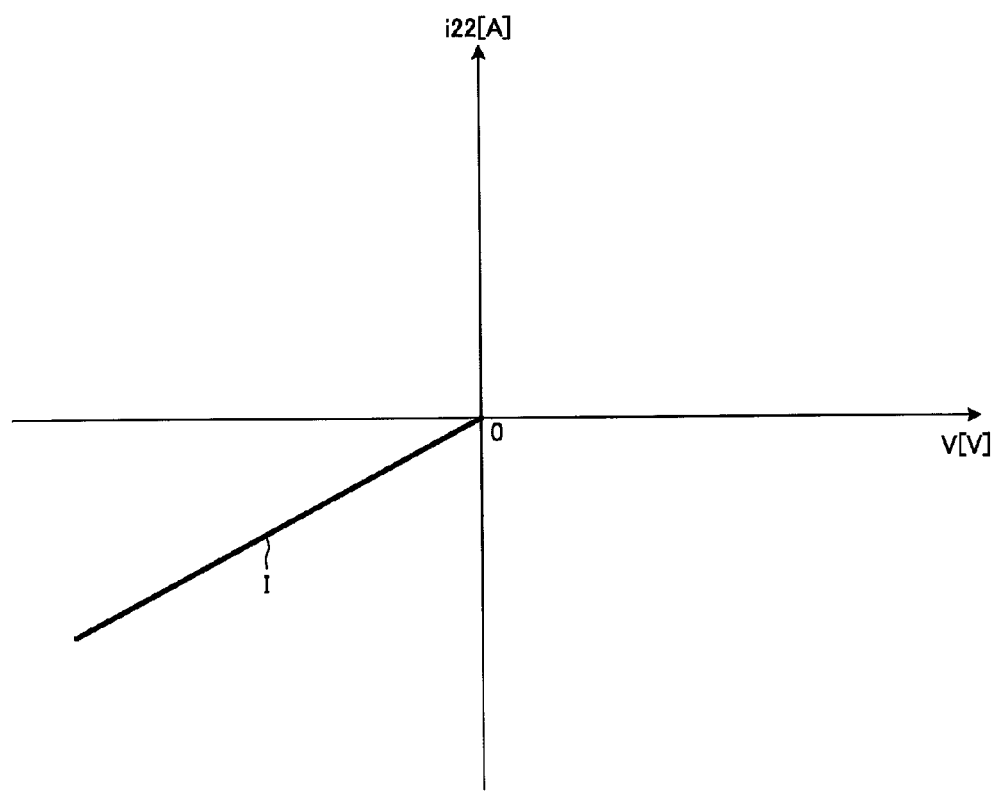
FIG. 9 is a graph showing the relation between induced voltage and current flowing through a twenty-second electric path.

FIG. 9 is a graph showing the relation between induced voltage V and current i22 flowing through the twenty-second electric path L22. In the graph, the horizontal axis represents the induced voltage V [V], and the vertical axis represents the current i22 flowing through the twenty-second electric path L22. A change in the current i22 b with the induced voltage V is represented by a line I in the graph. In the case where the duty ratio of the switch 57 is 100%, the current i22 is represented by V/R22, wherein V represents the induced voltage [volt], and R22 represents the resistance [Ω] of the twenty-second resistor element 59. As can be understood from the graph, the current i22 increases (in the negative direction) in proportion to an increase in the induced voltage V (in the negative direction).

The induced current i2 flowing through the second electric circuit dfea during a separating motion between the sprung member and the unsprung member (i.e., when the electrical shock absorber 20 is extended) is represented by the sum of the current i21 flowing through the twenty-first electric path L21 and the current i22 flowing through the twenty-second electric path L22.

Figure 10:
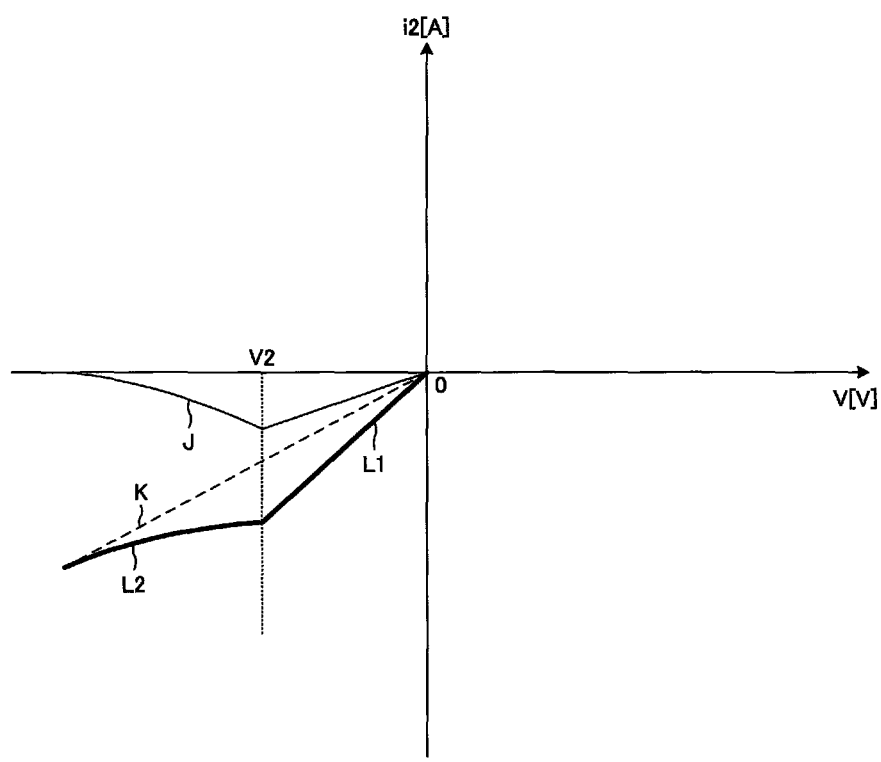
FIG. 10 is a graph showing the relation between induced voltage and current flowing through a second electric circuit.

FIG. 10 is a graph showing the relation between induced voltage V and current i2 flowing through the second electric circuit dfea. In the graph, a thick line represents a change in the current i2 with the induced voltage V. Furthermore, a line J represents a change in the current i21 flowing through the twenty-first electric path L21 with the induced voltage V, and a line K represents a change in the current i22 flowing through the twenty-second electric path L22 with the induced voltage V.

As described above, when the magnitude of the induced voltage V is equal to or less than the threshold voltage V2, the second reference current i2* flows through the twenty-first electric path L21. Therefore, in this case, a current equal to the sum of the second reference current i2* and the current i22 flowing through the twenty-second electric path L22 flows through the second electric circuit dfea. This changing characteristic of the current with the induced voltage V is represented by a portion L1 of the thick line in the graph. Meanwhile, when the magnitude of the induced voltage V is greater than the threshold voltage V2, the magnitude of the current flowing through the twenty-first electric path L21 is limited by the second P-channel JFET 60, whereby a current which is equal in magnitude to the second limit current iDS2 flows through the twenty-first electric path L21. Therefore, when the magnitude of the induced voltage V is greater than the threshold voltage V2, a current equal to the sum of the second limit current iDS2 and the current i22 flowing through the twenty-second electric path L22 flows through the second electric circuit dfea. This changing characteristic of the current with the induced voltage V is represented by a portion L2 of the thick line in the graph.

As can be understood from FIG. 10, in the case where a current flows through the second electric circuit dfea, the changing characteristic of the current i2 with the induced voltage V changes at the threshold voltage V2. When the magnitude of the induced voltage V is equal to or less than the threshold voltage V2, the magnitude of the current i21, which is a portion of the current i2, is not limited by the second P-channel JFET 60. Therefore, the rate of change of the current i2 with the induced voltage V at that time; i.e., the inclination of the portion L1, is large. Meanwhile, when the magnitude of the induced voltage V is greater than the threshold voltage V2, the magnitude of the current i21, which is a portion of the current i2, is limited by the second P-channel JFET 60 on the basis of the electrical characteristic of the second P-channel JFET 60. Therefore, the rate of change of the current i2 with the induced voltage V at that time; i.e., the inclination of the portion L2, is small.

The magnitude of damping force is represented by the magnitude of the induced current flowing through the motor 21 and the electric circuit 50. Furthermore, as described above, the magnitude of the stoke speed of the electrical shock absorber 20 is represented by the magnitude of the induced voltage. Accordingly, the relation between damping force and stroke speed is represented by the relation between induced current and induced voltage.

Moreover, when the sprung member and the unsprung member approach each other and the electrical shock absorber 20 is compressed, an induced current flows through the first electric circuit cfeb; and when the sprung member and the unsprung member separate from each other and the electrical shock absorber 20 is extended, an induced current flows through the second electric circuit dfea. Accordingly, the relation between damping force and stroke speed for the case where the electrical shock absorber 20 is compressed is represented by the relation between the induced voltage V and the induced current i1 flowing through the first electric circuit cfeb shown in FIG. 7, and the relation between damping force and stroke speed for the case where the electrical shock absorber 20 is extended is represented by the relation between the induced voltage V and the induced current i2 flowing through the second electric circuit dfea shown in FIG. 10.

Figure 11:
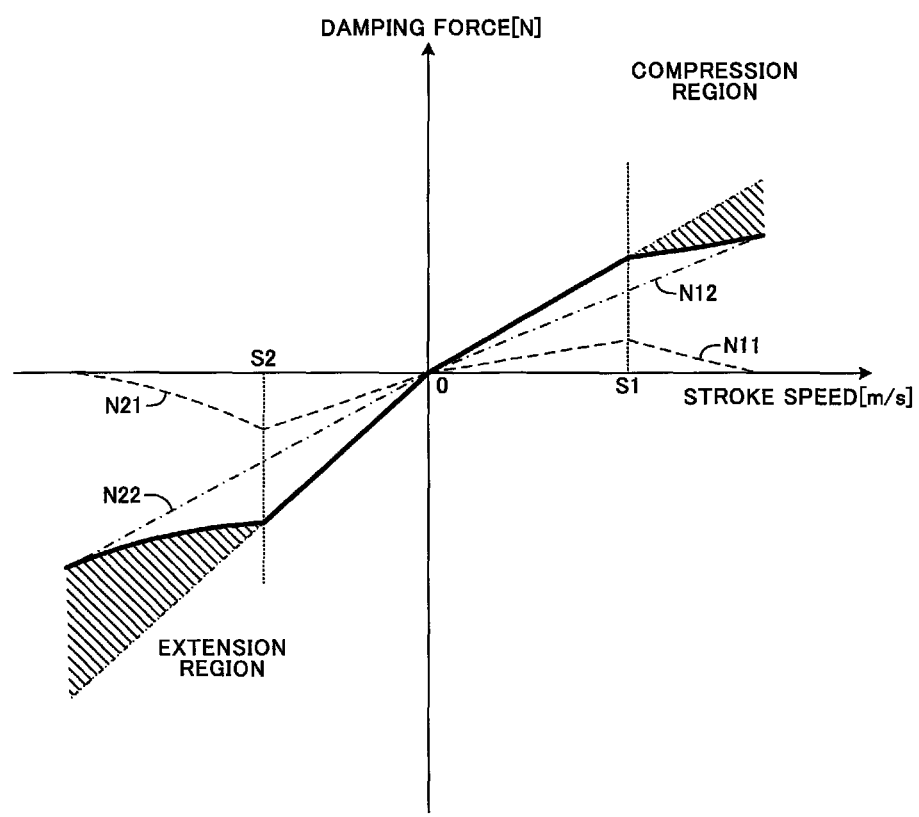
FIG. 11 is a graph showing the damping force characteristic of the electrical shock absorber according to the present embodiment.

FIG. 11 is a graph showing a change in damping force with stroke speed (damping force characteristic) for the case where the electrical shock absorber 20 according to the present embodiment is used. In the graph, the horizontal axis represents stroke speed, and the vertical axis represents damping force. In the graph, the stroke speed assumes a positive value when the electrical shock absorber 20 is compressed, and assumes a negative value when the electrical shock absorber 20 is extended. Furthermore, the damping force generated when the electrical shock absorber 20 is compressed is represented by a positive value, and the damping force generated when the electrical shock absorber 20 is extended is represented by a negative value.

In FIG. 11, a thick line represents a change in damping force with stroke speed (damping force characteristic). The damping force characteristic in a region (compression region) in which the electrical shock absorber 20 is compressed corresponds to the changing characteristic of the current i1 with the induced voltage V shown in FIG. 7, and the damping force characteristic in a region (extension region) in which the electrical shock absorber 20 is extended corresponds to the changing characteristic of the current i2 with the induced voltage V shown in FIG. 10. Also, a stroke speed corresponding to the threshold voltage V1 of FIG. 7 is represented by a threshold speed S1, and a stroke speed corresponding to the threshold voltage V2 of FIG. 10 is represented by a threshold speed S2.

Furthermore, in the graph, a line N11 represents change, with stroke speed, of the damping force which is represented by the current i11 which flows through the eleventh electric path L11 and which is a portion of the current i1 flowing through the first electric circuit cfeb when the electrical shock absorber 20 is compressed. A line N12 represents change, with stroke speed, of the damping force which is represented by the current i12 which flows through the twelfth electric path L12 and which is a portion of the current i1. The damping force generated upon compression of the electrical shock absorber 20 is represented by the sum of the damping force represented by the line N11 and the damping force represented by the line N12. A line N21 represents change, with stroke speed, of the damping force which is represented by the current i21 which flows through the twenty-first electric path L21 and which is a portion of the current i2 flowing through the second electric circuit dfea when the electrical shock absorber 20 is extended. A line N22 represents change, with stroke speed, of the damping force which is represented by the current i22 which flows through the twenty-second electric path L22 and which is a portion of the current i2. The damping force generated upon extension of the electrical shock absorber 20 is represented by the sum of the damping force represented by the line N21 and the damping force represented by the line N22.

As shown in FIG. 11, in the compression region, the damping force characteristic attained when the magnitude of stroke speed is equal to or less than the threshold speed S1 differs from that attained when the magnitude of stroke speed is greater than the threshold speed S1. The rate of increase of damping force with stroke speed in the case where the magnitude of stroke speed is greater than the threshold speed S1 is smaller than that in the case where the magnitude of stroke speed is equal to or less than the threshold speed S1. That is, in a high stroke speed region in which the magnitude of stroke speed is greater than the threshold speed S1, the rate of increase of damping force with stroke speed is lowered.

Similarly, in the extension region, the damping force characteristic attained when the magnitude of stroke speed is equal to or less than the threshold speed S2 differs from that attained when the magnitude of stroke speed is greater than the threshold speed S2. The rate of increase of damping force with stroke speed in the case where the magnitude of stroke speed is greater than the threshold speed S2 is smaller than that in the case where the magnitude of stroke speed is equal to or less than the threshold speed S2. That is, in a high stroke speed region in which the magnitude of stroke speed is greater than the threshold speed S2, the rate of increase of damping force with stroke speed is lowered.

As described above, according to the present embodiment, the rate of increase of damping force with stroke speed is lowered when the magnitude of stroke speed is large; i.e., when the relative speed between the sprung member and the unsprung member is large, irrespective of whether the electrical shock absorber 20 is compressed (during an approaching motion between the sprung member and the unsprung member) or extended (during a separating motion between the sprung member and the unsprung member). That is, the magnitude of damping force is suppressed in the high stroke speed region. Since the magnitude of damping force is suppressed when the magnitude of stroke speed is large, the magnitude of damping force against a high-frequency component of an input displacement can be suppressed. As a result of a suppression of the magnitude of damping force against a high-frequency component of an input displacement, the magnitude of a sprung displacement caused by the high-frequency component of the input displacement can be reduced. Thus, the displacement transmission ratio for the high-frequency component of the input displacement can be reduced, whereby riding quality is improved.

As described above, the electrical shock absorber 20 of the present embodiment includes the motor 21, which is rotated by approaching and separating motions between the sprung member and the unsprung member which approach and separate from each other; and the electric circuit 50, which connects together the electric terminals of the motor 21 so as to cause current to flow through the motor 21. When the motor 21 is rotated by an approaching motion or separating motion between the sprung member and the unsprung member and a voltage is induced accordingly, an induced current flows through the motor 21 and the electric circuit 50. As a result, a damping force is generated against the approaching motion or separating motion between the sprung member and the unsprung member.

The electric circuit 50 includes the P-channel JFETs 56, 60. The P-channel JFETs 56, 60 are connected to the electric circuit 50 such that the induced current flowing through the electric circuit 50 can flow through the drain-source path of each JFET. The gate of the P-channel JFET 56, 60 is connected to one electric terminal of the motor 21, and the source of the P-channel JFET 56, 60 is connected to the other electric terminal of the motor 21. Therefore, the induced voltage is applied to the gate. That is, the gate voltage VGS changes in accordance with the magnitude of the induced voltage. The induced voltage represents the stroke speed of the electrical shock absorber 20. Therefore, the gate voltage VGS is changed on the basis of the relative speed between the sprung member and the unsprung member such that the gate voltage VGS increases with the stroke speed of the electrical shock absorber 20; that is, the above-mentioned relative speed between the sprung member and the unsprung member. By means of changing the gate voltage VGS, the magnitude of the induced current flowing through the electric circuit 50 is limited by the P-channel JFETs 56, 60 on the basis of the electrical characteristic of the P-channel JFET 56, 60 (characteristic in terms of change of the drain-source current iDS with the gate voltage VGS). Thus, the magnitude of the induced current flowing through the electric circuit 50 is controlled.

The magnitude of the induced current flowing through the electric circuit 50 represents the magnitude of the damping force generated by the motor 21. Therefore, when the magnitude of the induced current flowing through the electric circuit 50 is limited, the magnitude of damping force which can be generated normally is suppressed. In the present embodiment, as shown in FIG. 11, the magnitude of damping force is suppressed when the magnitude of the stroke speed is equal to or greater than the threshold speed S1 (when the stroke speed is positive), or when the magnitude of the stroke speed is equal to or greater than the threshold speed S2 (when the stroke speed is negative). In FIG. 11, each of hatched areas represents the difference between the damping force which can be generated normally and the suppressed damping force (the actually generated damping force) for the case where the magnitude of the stroke speed is equal to or greater than the threshold speed S1 (when the stroke speed is positive), or the case where the magnitude of the stroke speed is equal to or greater than the threshold speed S2 (when the stroke speed is negative). As described above, the present embodiment proposes the electrical shock absorber 20 which can change the damping force characteristic on the basis of the stroke speed.

Furthermore, through employment of the electrical shock absorber 20 of the present embodiment, the magnitude of damping force can be suppressed in a high stroke speed region. Therefore, a displacement of the sprung member caused by a high-frequency component of an input displacement can be reduced, whereby the riding quality of the vehicle can be improved.

Also, the electric circuit 50 includes the eleventh electric path L11 (the twenty-first electric path L21) in which the P-channel JFET 56 (60) is provided, and the twelfth electric path L21 (the twenty-second electric path L22) in which the resistor element 55 (59) is provided and which is connected in parallel to the eleventh electric path L11 (the twenty-first electric path L21). Accordingly, the induced current i1 (i2) flowing through the electric circuit 50 is represented by the sum of the current i11 (i21) flowing through the eleventh electric path L11 (the twenty-first electric path L21) and the current i12 (i22) flowing through the twelfth electric path L21 (the twenty-second electric path L22). By means of liming the magnitude of the current i11 (i21) flowing through the eleventh electric path L11 (the twenty-first electric path L21) on the basis of the electrical characteristic of the P-channel JFET 56 (60), the damping force characteristic can be changed properly on the basis of the relative speed (stroke speed) between the sprung member and the unsprung member. Moreover, the required damping force can be secured by the current i12 (i22) flowing through the twelfth electric path L21 (the twenty-second electric path L22).

Furthermore, the electric circuit 50 includes the first electric circuit cfeb, through which an induced current flows when the motor 21 rotates in one direction as a result of an approaching motion between the sprung member and the unsprung member (when the electrical shock absorber 20 is compressed), and the second electric circuit dfea, through which an induced current flows when the motor 21 rotates in the other direction as a result of a separating motion between the sprung member and the unsprung member (when the electrical shock absorber 20 is extended). A P-channel JFET is provided in each of the first electric circuit cfeb and the second electric circuit dfea. Therefore, the damping force characteristic can be changed individually for each of approaching and separating motions between the sprung member and the unsprung member.

Figure 12:
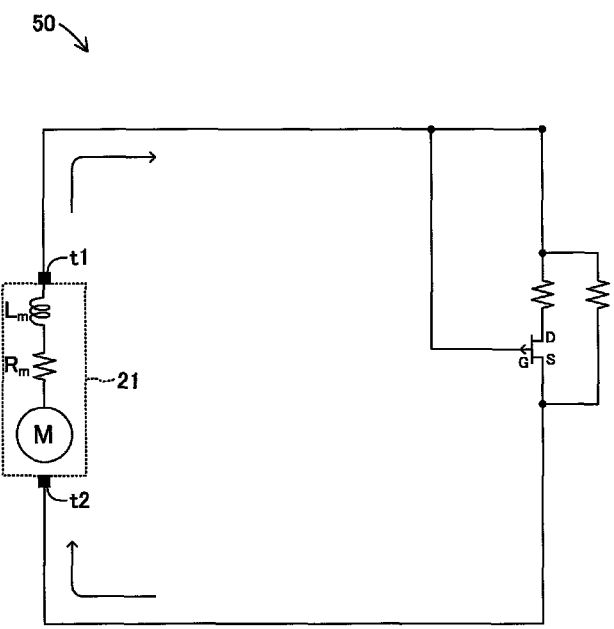
FIG. 12 is a diagram showing an electric circuit configured such that induced current flows through a circuit which is common between compression and extension motions of the electrical shock absorber.

Although the embodiment of the present invention has been described, the present invention is not limited to the above-described embodiment. For example, the above-described embodiment proposes use of the electric circuit 50 configured such that, as shown in FIG. 3, an induced current flows through different circuits depending on whether the electrical shock absorber 20 is compressed or extended. However, the electric circuit may be configured such that an induced current flows through a circuit common between compression and extension motions of the electrical shock absorber 20. FIG. 12 is a diagram showing an electric circuit configured such that an induced current flows through a circuit which is common between compression and extension motions of the electrical shock absorber 20. In the electric circuit shown in FIG. 12, for example, the first electric terminal t1 of the motor 21 assumes a high potential and the second electric terminal t2 thereof assumes a low potential irrespective of whether the electrical shock absorber 20 is compressed or extended. Accordingly, the induced current can be caused to flow through a circuit which is common between the compression and extension motions. Notably, in this case, there must be provided a mechanism which causes the motor to always rotate in one direction irrespective of whether the electrical shock absorber is compressed or extended. For example, the electrical shock absorber is mechanically modified such that the rotor within the motor comes into a meshing engagement with a reverse gear only when the electrical shock absorber is extended. Thus, the motor can be rotated in one direction at all times.

Figure 13:
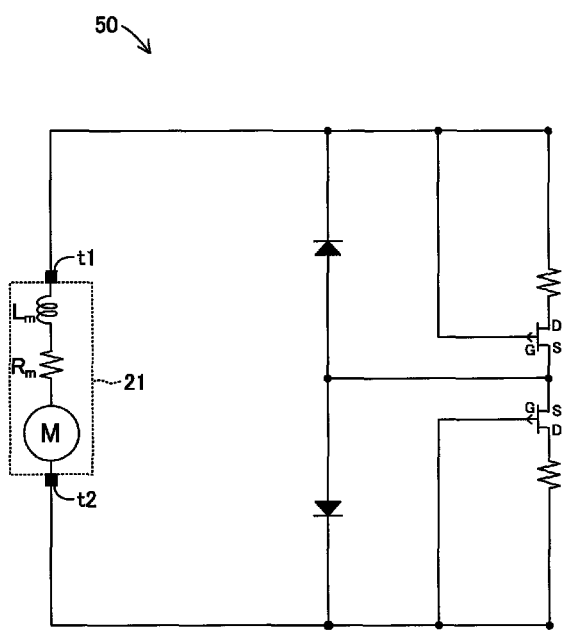
FIG. 13 is a diagram showing an electric circuit which is constituted by only electric paths each including a resistor element and a P-channel junction field effect transistor.
Figure 14:
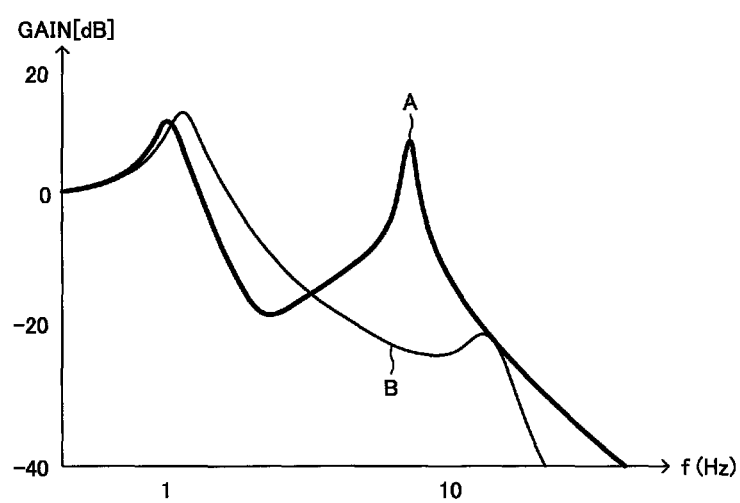
FIG. 14 is a gain diagram showing a frequency characteristic of displacement transmission ratio.
Figure 15:
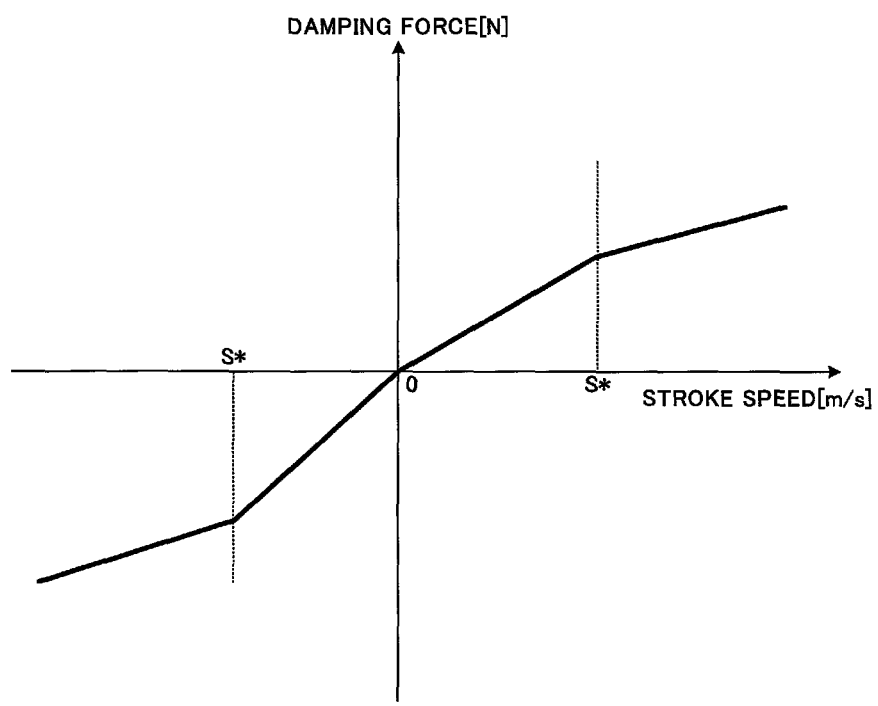
FIG. 15 is a graph showing the damping force characteristic of a typical conventional shock absorber.
Figure 16:
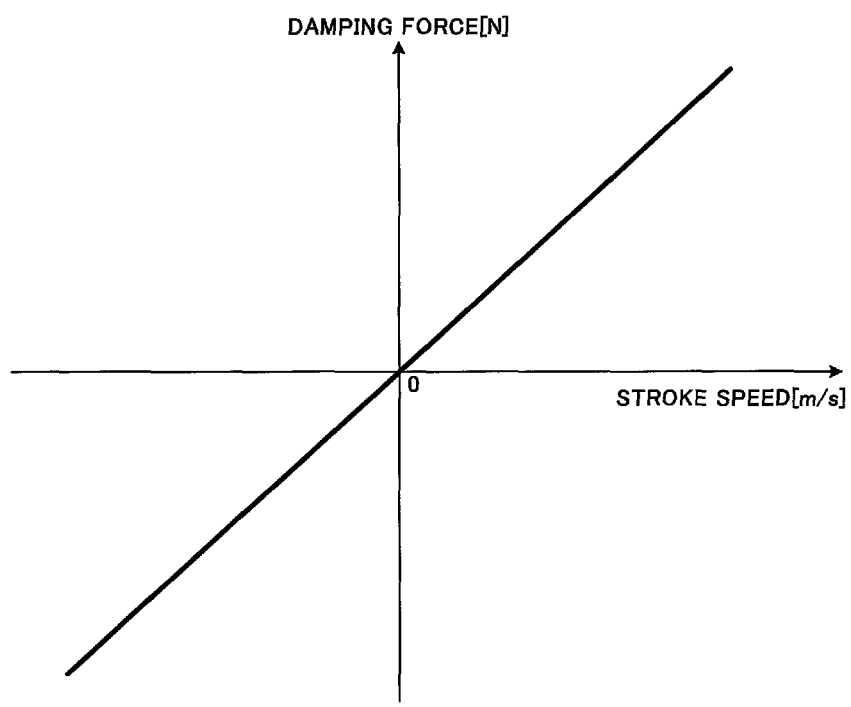
FIG. 16 is a graph showing the damping force characteristic of a typical electrical shock absorber.

Moreover, the electric circuit 50 shown in the above-described embodiment is configured such that an electric path including a resistor element and a P-channel JFET and an electric path including a resistor element are connected in parallel. However, as shown in FIG. 13, the electric circuit may be constituted by only electric paths each including a resistor element and a P-channel JFET. Notably, in this case, when the magnitude of the stroke speed increases (that is, the magnitude of the induced voltage increase), there may arise a possibility that no current flows through the electric circuit 50 and the required damping force cannot be obtained. Accordingly, it is preferred that, as shown in FIG. 3, an electric path including a resistor element is connected in parallel to each electric path including a P-channel JFET in order to secure the required damping force in a high stroke speed region.

Moreover, in the above-described embodiment, each of the FETs provided in the electric circuit is a P-channel JFET. However, in order to obtain a desired damping force characteristic, the magnitude of the induced current flowing through the electric circuit may be limited through use of other types of FETs. As described above, the present invention can be modified without departing from the scope of the invention.

The invention claimed is:

1. An electrical shock absorber comprising:
a motor which is rotated by approaching and separating motions between first and second members which approach and separate from each other; and
an electric circuit which connects two electric terminals provided on the motor so as to cause current to flow through the motor,
the electrical shock absorber being configured such that, when the motor is rotated by an approaching motion or separating motion between the first and second members, an induced voltage appears between the two electric terminals, and an induced current flows through the motor and the electric circuit, whereby the electrical shock absorber generates a damping force against the approaching motion or separating motion between the first and second members,
a P-channel junction field effect transistor provided in the electric circuit;
the P-channel junction field effect transistor connected to the electric circuit such that the induced current flowing through the electric circuit can flow through a drain-source path of the P-channel junction field effect transistor, wherein
the P-channel junction field effect transistor limits the magnitude of the induced current flowing through the electric circuit by using an electrical characteristic of the P-channel junction field effect transistor in terms of change of a drain-source current iDS with a gate voltage VGS which is applied to the P-channel junction field effect transistor and is changed on the basis of relative speed between the first member and the second member such that the magnitude of a drain-source current iDs decreases as the gate voltage VGS of the P-channel junction field effect transistor increases.

2. An electrical shock absorber according to claim 1, wherein the gate voltage VGS is changed on the basis of the magnitude of the induced voltage.

3. An electrical shock absorber according to claim 2, wherein the gate of the field effect transistor is connected to the electric circuit such that the gate voltage VGS changes on the basis of the magnitude of the induced voltage.

4. An electrical shock absorber according to claim 1, wherein the electric circuit includes a first connection path in which the P-channel junction field effect transistor is provided, and a second connection path in which a resistor element is provided and which is connected in parallel to the first connection path.

5. An electrical shock absorber according to claim 4, wherein
 a resistor element is provided in the first connection path; and
 the P-channel junction field effect transistor limits the magnitude of current flowing through the first connection path on the basis of the characteristic of the P-channel junction field effect transistor in terms of change of the drain-source current iDS with the gate voltage VGS.

6. An electrical shock absorber according to claim 1, wherein
 the electric circuit includes a first electric circuit through which a current flows when the motor rotates in one direction as a result of an approaching motion between the first member and the second member, and a second electric circuit through which a current flows when the motor rotates in the other direction as a result of a separating motion between the first member and the second member; and
 the P-channel junction field effect transistor is provided in each of the first electric circuit and the second electric circuit.

7. An electrical shock absorber according to claim 6, wherein
 the first electric circuit includes a first connection path in which the P-channel junction field effect transistor is provided and a second connection path in which a resistor element is provided and which is connected in parallel to the first connection path; and
 the second electric circuit includes a first connection path in which the P-channel junction field effect transistor is provided and a second connection path in which a resistor element is provided and which is connected in parallel to the first connection path of the second electric circuit.

8. An electrical shock absorber according to claim 7, wherein
 a resistor element is provided in each of the first connection path of the first electric circuit and the first connection path of the second electric circuit;
 the P-channel junction field effect transistor provided in the first connection path of the first electric circuit limits the magnitude of the current flowing through the first connection path of the first connection circuit on the basis of the characteristic of the P-channel junction field effect transistor provided in the first connection path of the first electric circuit in terms of change of the drain-source current iDS with the gate voltage VGS; and
 the P-channel junction field effect transistor provided in the first connection path of the second electric circuit limits the magnitude of the current flowing through the first connection path of the second electric circuit on the basis of the characteristic of the P-channel junction field effect transistor provided in the first connection path of the second electric circuit in terms of change of the drain-source current iDS with the gate voltage VGS.

* * * * *